Patented Jan. 2, 1923.

1,440,964

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing. Original application filed April 1, 1922, Serial No. 548,826. Divided and this application filed April 1, 1922. Serial No. 548,830.

*To all whom it may concern:*

Be it known that I, SIDNEY M. CADWELL, a citizen of the United States, residing at Leonia, county of Bergen, and State of New Jersey, have invented certain new and useful Improvements in Processes for Vulcanizing Rubber and Products Obtained Thereby, of which the following is a full, clear, and exact description.

This invention relates to vulcanizing rubber and similar materials and products obtained thereby, being more particularly directed to acceleration of vulcanization by a class of organic accelerators and products resulting from such vulcanization.

This case is a continuation in part of application Serial No. 379,492, filed May 7, 1920 and a division of application Serial No. 548,826, filed April 1, 1922.

One object of the invention is to provide a process of the kind mentioned employing accelerators obtainable from inexpensive raw materials by a simple method. Another object of the invention is to provide a process in which accelerators of the kind mentioned may be readily compounded with rubber, or similar material, which shall permit of the carrying out of vulcanization at ordinary temperatures, in masses of rubber or in thin sheets, while avoiding the generation of acids during the process of vulcanization, as, for example, takes place when sulphur chloride is used. Another object is to provide a series of products having generally desirable physical characteristics, such as high tensile strength, resistance to aging, resistance to flexing, etc., and which shall be substantially free from the odor of the vulcanizing ingredients employed. Other objects will in part be obvious and in part pointed out hereinafter.

The invention accordingly consists broadly in the process, and product obtained therefrom, for treating rubber and similar materials, which comprises subjecting the rubber to a vulcanizing agent and a substance containing the radical $$\underset{X}{\overset{RCSM,}{\|}}$$

and vulcanizing the rubber. In this formula, R represents any element subject to the limitation mentioned hereinafter; M represents a salt-forming element or group or hydrogen, such as zinc, ammonium, etc., and is designated as representing a metal or being metallic, or a radical $$\underset{X}{\overset{SCR}{\|}}$$

or a radical $$\underset{X}{\overset{CR;}{\|}}$$

and X represents any bivalent element or radical, such as sulphur, oxygen, etc., subject to the limitation mentioned later.

It will be seen that the substances containing the radical fall into three groups corresponding to the three said significations of M. In the first two groups the symbol R in $$\underset{X}{\overset{RCSM}{\|}}$$

is limited to any element except nitrogen; in the third group where M represents $$\underset{X}{\overset{CR}{\|}}$$

this limitation is absent. In the table herein shown forming part of the specification, there is shown the broad group containing the radical $$\underset{X}{\overset{\|}{RCSM,}}$$

sub-divided into three smaller groups which are respectively $$\underset{\underset{etc.}{M=Metal,}}{\overset{\|}{RCSM,}} \underset{\underset{X}{\|}}{\overset{\|}{RCSSCR,}} \underset{\underset{X}{\|}}{\overset{\|}{RCSCR.}}$$
$$M=SCR \quad M=CR$$

It will be noted that the group formulæ represent generally derivatives of carbon oxysulphide or carbon disulphide.

The formulæ of the first two groups mentioned, in which the first symbol R is any element except nitrogen, may be written $$\underset{X}{\overset{\|}{R'CSM,}}$$

under which fall $$\underset{X}{\overset{\|}{R'CSM,}}$$

where M is the metal and thiol salts are included, and $$\underset{X\ X}{\overset{\|\ \|}{R'CSSCR,}}$$

where M is equal to $$\underset{X}{\overset{\|}{SCR}}$$

and the disulphides are represented. The formula $$\underset{X\ X}{\overset{\|\ \|}{RCSCR}}$$

represents monosulphides which may be regarded as thiol acid anhydrides. R' in these formulæ designates any element except nitrogen.

In employing the first group of those mentioned above including substances having the formula $$\underset{X}{\overset{\|}{R'CSM,}}$$

it has been found that M preferably represents either zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is $$\underset{X}{\overset{\|}{R'CSM'}}$$

where M' represents one of the preferred metals given. M' may be substituted by any metal provided that one of the metals just mentioned is present in the combination either at some other position in the formula including $$\underset{X}{\overset{\|}{R'CSM}}$$

or be introduced otherwise than as part of this compound. In connection with the other groups mentioned, namely, those represented by the formulæ

$$\underset{X\ X}{\overset{\|\ \|}{R'CSSCR}}$$

and $$\underset{X\ X}{\overset{\|\ \|}{RCSCR}}$$

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:— zinc, mercury, preferably in the mercuric state, lead, preferably in the plumbous state, cadmium, copper, preferably in the cupric state, arsenic, preferably in the arsenous state, manganese, preferably in the manganous state. As noted in connection with the first group, the metals employed with groups 2 and 3 may be present in any combined form.

In the table mentioned above, R and X are shown as represented by carbon, oxygen, nitrogen and sulphur, which are four of the more important elements occurring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:—

1,440,964

| | Group I. | | | |
|---|---|---|---|---|
| R′CSM<br>‖<br>X<br>M Metal<br>Thiol salts. | 1. OCSM<br>‖<br>S | 2. OCSM<br>‖<br>O | 3. OCSM<br>‖<br>NR | 4. OCSM<br>‖<br>CH₂ |
| | 5. CCSM<br>‖<br>S | 6. CCSM<br>‖<br>O | 7. CCSM<br>‖<br>NR | 8. CCSM<br>‖<br>CH₂ |
| | 9. SCSM<br>‖<br>S | 10. SCSM<br>‖<br>O | 11. SCSM<br>‖<br>NR | 12. SCSM<br>‖<br>CH₂ |
| | 13. NCSM<br>‖<br>S | 14. NCSM<br>‖<br>O | 15. NCSM<br>‖<br>NR | 16. NCSM<br>‖<br>CH₂ |

| | Group II. | | | |
|---|---|---|---|---|
| R′CSSOR<br>‖  ‖<br>X   X<br>M=SCR<br>‖<br>X<br>Disulphides. | 17. OCSSCO<br>‖=‖<br>S  S | 18. OCSSCO<br>‖=‖<br>O  O | 19. OCSSCO<br>‖=‖<br>NR NR | 20. OCSSCO<br>‖=‖<br>CH₂ CH₂ |
| | 21. CCSSCC<br>‖=‖<br>S  S | 22. CCSSCC<br>‖=‖<br>O  O | 23. CCSSCC<br>‖=‖<br>NR NR | 24. CCSSCC<br>‖=‖<br>CH₂ CH₂ |
| | 25. SCSSCS<br>‖=‖<br>S  S | 26. SCSSCS<br>‖=‖<br>O  O | 27. SCSSCS<br>‖=‖<br>NR NR | 28. SCSSCS<br>‖=‖<br>CH₂ CH₂ |
| | 29. NCSSCN<br>‖=‖<br>S  S | 30. NCSSCN<br>‖=‖<br>O  O | 31. NCSSCN<br>‖=‖<br>NR NR | 32. NCSSCN<br>‖=‖<br>CH₂ CH₂ |

| | Group III. | | | |
|---|---|---|---|---|
| RCSCR<br>‖  ‖<br>X   X<br>M=CR<br>‖<br>X<br>Monosulphides. | 33. OCSCO<br>‖=‖<br>S  S | 34. OCSCO<br>‖=‖<br>O  O | 35. OCSCO<br>‖=‖<br>NR NR | 36. OCSCO<br>‖=‖<br>CH₂ CH₂ |
| | 37. CCSCC<br>‖=‖<br>S  S | 38. CCSCC<br>‖=‖<br>O  O | 39. CCSCC<br>‖=‖<br>NR NR | 40. CCSCC<br>‖=‖<br>CH₂ CH₂ |
| | 41. SCSCS<br>‖=‖<br>S  S | 42. SCSCS<br>‖=‖<br>O  O | 43. SCSCS<br>‖=‖<br>NR NR | 44. SCSCS<br>‖=‖<br>CH₂ CH₂ |
| | 45. NCSCN<br>‖=‖<br>S  S | 46. NCSCN<br>‖=‖<br>O  O | 47. NCSCN<br>‖=‖<br>NR NR | 48. NCSCN<br>‖=‖<br>CH₂ CH₂ |

RCSM<br>‖<br>X

Group III.

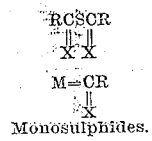

Monosulphides.

In general it is to be noted in connection with members of this group that they are able to accelerate both hot vulcanization, that is, vulcanization at or above 240° F. and vulcanization below such temperatures and that they may be used for such vulcanization in thick masses of rubber, in thin sheets, or in cements. They are particularly adapted for accelerating hot vulcanization. Although active as accelerators they exhibit substantially no tendency to cause prevulcanization or "burning" by milling.

The general procedure for vulcanizing employing members of this group is as follows:—100 parts of rubber, 10 parts of zinc oxide, 3 parts of sulphur, and 0.1–3.0 parts of the accelerator are mixed. If vulcanization with heat is employed the usual temperature or lower is used for periods of thirty minutes or more to complete vulcanization. The normal or usual temperatures of hot vulcanization are 240° F. or above. Where vulcanization at ordinary room temperature, approximately 70° F., is desired the mixed materials are allowed to stand at ordinary room temperature for approximately one week when vulcanization is complete. In connection with curing at such temperatures, it is pointed out that the curing is effected in a longer time than is required in the use of members of Groups 1 and 2 set forth in my copending applications Serial Nos. 548,826, 548,827, 548,828 and 548,829.

The procedure given above may be employed with thin or thick masses of rubber, and in the case of cements where a solvent is used with the mixture, the procedure after mixing and evaporation of the solvent is substantially identical with that employed for thin masses of rubber. The group possesses the particular advantage that its members may be introduced into bulk rubber with practically no danger of prevulcanization or burning when milled. As pointed out above, a combined metal, preferably in the form of a metallic oxide such as zinc oxide, is employed in connection with members of this group. The oxides are generally designated as $M'_xO_y$, $M'$ having previously been defined. In general the use of bases, particularly amines, is preferred in connection with members of this group.

The action of the addition of primary and secondary amines to materials of this class has been found to be as follows: The acceleration by aliphatic amines is greatest when approximately one and one-half times the molecular weight of the amine on the basis of the molecular weight of the compound is used. An excess of primary aliphatic amine retards the cure considerably. An excess of secondary aliphatic amine retards the cure less. The greater the amount of primary aromatic amine added, the greater the acceleration. Tertiary amines have substantially no effect. Dibenzyl amine has given excellent results in the acceleration of vulcanization according to the invention. Sodium hydroxide also accelerates the action of monosulphides.

Species 38.

The following member of this species has been employed to give good results in connection with the process included in the invention:

Thiolbenzoic anhydride

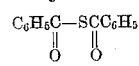

also unsymmetrical compounds occupying midway position between species 37 and 38:—

Benzoylbutylxanthogenate

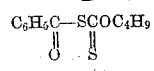

Benzoylethylxanthogenate

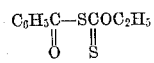

The substance thiolbenzoic anhydride and similar substances are set forth and claimed in co-pending application Serial No. 548,831, filed April 1, 1922.

As a specific example of curing below the normal hot vulcanizing temperatures, the following procedure may be carried out: 100 parts of rubber, 10 parts of zinc oxide, 3 parts of sulphur, 2 parts of paratoluidine, and 5 parts of thiolbenzoic anhydride are mixed by milling in the usual manner, and the mixture is vulcanized at 212° F. for 2 hours in open air.

Species 45.

In employing members of this class the following is a preferred embodiment: 100 parts of rubber, 10 parts zinc oxide, 3 parts of sulphur, 0.1 part of diphenyldimethylthiurammonosulphide are mixed on a mill in the usual way and the product is cured in a mold under 40 lbs. steam pressure for 10 minutes.

Vulcanization may be effected in open steam or air with approximately similar results and the time of vulcanization may be prolonged without damage to the stock, although, of course, the time of vulcanization will be dependent on the thickness of the goods. The resultant product is odorless and colorless and has the usual excellent properties of rubber cured with sulphur.

The accelerator above mentioned is prepared by dissolving 1 mol of ammonium salt of phenylmethyldithiocarbamic acid in alcohol and treating it with ½ mol of bromcyanide, CNB$_r$., dissolved in alcohol; or an alcoholic solution of ammonium phenylmethyldithiocarbamate may be treated with phenylmethylthiocarbamic acid chloride in alcoholic solution. Other methods of preparation may be employed and applicant does not limit himself to the methods of preparation of accelerators herein described.

Other members of this class include:
Tetramethylthiurammonosulphide

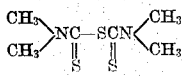

Tetraethylthiurammonosulphide

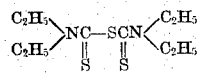

Diphenyldiethylthiurammonosulphide

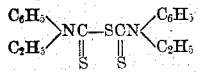

Tetrapropylthiurammonosulphide

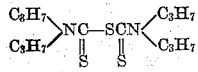

E t h y l p h e nyldimethylthiurammonosulphide

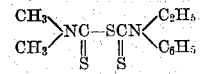

Methylphenylethylthiurammonosulphide

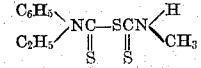

Phenylmethylcarbamylester of phenylmethyldithiocarbamic acid

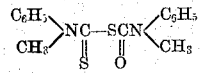

N-piperidyl-S-benzoyldithiourethane

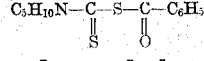

It will be understood that the invention disclosed in copending application Serial No. 441,691, filed February 1, 1921, may be employed in connection with the accelerators disclosed and included in the invention of the present application.

It is to be understood that rubber substitutes, synthetic rubber, balata, gutta percha, etc., may be similarly treated instead of rubber and it is intended to include such processes in the claims hereto appended.

By the use of accelerators of this group vulcanization is accomplished in a rapid and efficient manner substantially without danger of "burning" or prevulcanization while milling, and the raw materials used for making the accelerators are inexpensive. The processes themselves are rapid and efficient and easily carried out. The products possess desirable physical characteristics, such as good tensile strength, resistance to aging, resistance to flexing, and in general are free from the odor of vulcanizing ingredients.

It will thus be seen that among others the objects of the invention above enumerated are achieved.

As many apparently widely different embodiments of this invention may be made without departing from the spirit thereof, it will be understood that I do not intend to limit myself to the specific embodiment herein set forth except as indicated in the appended claims.

Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent and an accelerator comprising the group.

and vulcanizing the rubber.

2. A process of vulcanizing rubber or similar material which comprises combining with the rubber a vulcanizing agent and an accelerator comprising the group

in the presence of a combined metal M′, and vulcanizing the rubber.

3. A process of vulcanizing rubber or similar material which comprises combining with the rubber a vulcanizing agent and an accelerator comprising the radical

and vulcanizing the rubber.

4. A process of vulcanizing rubber or similar material which comprises combining with the rubber a vulcanizing agent and an accelerator comprising the radical

in the presence of a combined metal M′, and vulcanizing the rubber.

5. A process of vulcanizing rubber or similar material which comprises combining with the rubber a vulcanizing agent and an accelerator comprising the radical $$\underset{S\ \ S}{\overset{\|\ \ \|}{NCSCN,}}$$

and vulcanizing the rubber.

6. A process of vulcanizing rubber or similar material which comprises combining with the rubber a vulcanizing agent and an accelerator comprising the radical $$\underset{S\ \ S}{\overset{\|\ \ \|}{NCSCN}}$$

in the presence of a combined metal M', and vulcanizing the rubber.

7. A process of vulcanizing rubber or similar material which comprises combining with the rubber a vulcanizing agent, an accelerator comprising the group $$\underset{X\ X}{\overset{\|\ \|}{RCSCR}}$$

and an amine, and vulcanizing the rubber.

8. A process of vulcanizing rubber or similar material which comprises combining with the rubber a vulcanizing agent, an accelerator comprising the group $$\underset{X\ X}{\overset{\|\ \|}{RCSCR}}$$

in the presence of a combined metal M' and an amine, and vulcanizing the rubber.

9. A process of vulcanizing rubber or similar material which comprises combining with the rubber a vulcanizing agent, an accelerator comprising the radical $$\underset{X\ X}{\overset{\|\ \|}{NCSCN}}$$

and an amine, and vulcanizing the rubber.

10. A process of vulcanizing rubber or similar material which comprises combining with the rubber a vulcanizing agent, an accelerator comprising the radical $$\underset{X\ X}{\overset{\|\ \|}{NCSCN}}$$

in the presence of a combined metal M' and an amine, and vulcanizing the rubber.

11. A process of vulcanizing rubber or similar material which comprises combining with the rubber a vulcanizing agent, an accelerator comprising the radical $$\underset{S\ S}{\overset{\|\ \|}{NCSCN}}$$

and an amine, and vulcanizing the rubber.

12. A process of vulcanizing rubber or similar material which comprises combining with the rubber a vulcanizing agent, an accelerator comprising the radical $$\underset{S\ S}{\overset{\|\ \|}{NCSCN}}$$

in the presence of a combined metal M' and an amine, and vulcanizing the rubber.

13. A process of vulcanizing rubber or similar material which comprises combining with the rubber a vulcanizing agent and an accelerator comprising the group $$\underset{X\ X}{\overset{\|\ \|}{RCSCR}}$$

in the presence of combined zinc, and vulcanizing the rubber.

14. A process of vulcanizing rubber or similar material which comprises combining with the rubber a vulcanizing agent and an accelerator comprising the radical $$\underset{X\ X}{\overset{\|\ \|}{NCSCN}}$$

in the presence of combined zinc, and vulcanizing the rubber.

15. A process of vulcanizing rubber or similar material which comprises combining with the rubber a vulcanizing agent and an accelerator comprising the radical $$\underset{S\ S}{\overset{\|\ \|}{NCSCN}}$$

in the presence of combined zinc, and vulcanizing the rubber.

16. The process of treating rubber or similar materials comprising combining it with a vulcanizing agent and a thiurammonosulphide, and vulcanizing the rubber.

17. The process of treating rubber or similar materials comprising combining it with a vulcanizing agent and an aryl alkyl thiurammonosulphide, and vulcanizing the rubber.

18. The process of treating rubber or similar materials comprising combining it with a vulcanizing agent and a thiurammonosulphide in the presence of a combined metal M', and vulcanizing the rubber.

19. The process of treating rubber or similar materials comprising combining it with a vulcanizing agent and an aryl alkyl thiurammonosulphide in the presence of a combined metal M', and vulcanizing the rubber.

20. The process of treating rubber or similar materials comprising combining it with a vulcanizing agent and a thiurammonosulphide in the presence of combined zinc, and vulcanizing the rubber.

21. The process of treating rubber or similar materials comprising combining it with a vulcanizing agent and an aryl alkyl thiuramsulphide in the presence of combined zinc, and vulcanizing the rubber.

22. The process of treating rubber or similar materials comprising combining it with a vulcanizing agent and a thiocarbamic acid anhydride.

23. The process of treating rubber or similar materials comprising combining it with a vulcanizing agent and a substance having the group $$\text{cyclic}-\underset{\underset{\text{alkyl}}{}}{N}\text{C}-\overset{\|}{\underset{S}{S}}-\text{C}\overset{\|}{\underset{S}{N}}-\text{cyclic}\\\text{alkyl}$$

and vulcanizing the rubber.

24. The process of treating rubber or similar materials comprising combining it with a vulcanizing agent and the compound

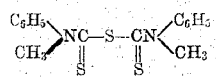

and vulcanizing the rubber.

25. The process of treating rubber or similar materials comprising combining 100 parts of rubber, 10 parts of zinc oxide, 3 parts of sulphur and 0.1 part of diphenyldimethylthiurammonosulphide, and vulcanizing the rubber under approximately 40 lbs. steam pressure for approximately 10 minutes.

26. A vulcanized rubber derived from rubber or similar material combined with a vulcanizing agent and an accelerator comprising the group

27. A vulcanized rubber derived from rubber or similar material combined with a vulcanizing agent and an accelerator comprising the group

RCSCR
‖ ‖
X X in the presence of a combined metal M'.

28. A vulcanized rubber derived from rubber or similar material combined with a vulcanizing agent and an accelerator comprising the radical

29. A vulcanized rubber derived from rubber or similar material combined with a vulcanizing agent and an accelerator comprising the radical

NCSCN
‖ ‖
X X in the presence of a combined metal M'.

30. A vulcanized rubber derived from rubber or similar material combined with a vulcanizing agent and an accelerator comprising the radical

31. A vulcanized rubber derived from rubber or similar material combined with a vulcanizing agent and an accelerator comprising the radical

in the presence of a combined metal M'.

32. A vulcanized rubber derived from rubber or similar material combined with a vulcanizing agent, an accelerator comprising the group

and an amine.

33. A vulcanized rubber derived from rubber or similar material combined with a vulcanizing agent, an accelerator comprising the group

in the presence of a combined metal M' and an amine.

34. A vulcanized rubber derived from rubber or similar material combined with a vulcanizing agent, an accelerator comprising the radical

and an amine.

35. A vulcanized rubber derived from rubber or similar material combined with a vulcanizing agent, an accelerator comprising the radical

in the presence of a combined metal M' and an amine.

36. A vulcanized rubber derived from rubber or similar material combined with a vulcanizing agent, an accelerator comprising the radical

and an amine.

37. A vulcanized rubber derived from rubber or similar material combined with a vulcanizing agent, an accelerator comprising the radical

in the presence of a combined metal M' and an amine.

38. A vulcanized rubber derived from rubber or similar material combined with a vulcanizing agent and an accelerator comprising the group

in the presence of combined zinc.

39. A vulcanized rubber derived from rubber or similar material combined with a vulcanizing agent and an accelerator comprising the radical

in the presence of combined zinc.

40. A vulcanized rubber derived from rubber or similar material combined with a vulcanizing agent and an accelerator comprising the radical

in the presence of combined zinc.

41. A vulcanized rubber derived from rubber or similar material combined with a vulcanizing agent and a thiurammonosulphide.

42. A vulcanized rubber derived from rubber or similar material combined with a vulcanizing agent and an aryl alkyl thiurammonosulphide.

43. A vulcanized rubber derived from rubber or similar material combined with a vulcanizing agent and a thiurammonosulphide in the presence of a combined metal M'.

44. A vulcanized rubber derived from rubber or similar material combined with a vulcanizing agent and an aryl alkyl thiurammonosulphide in the presence of a combined metal M'.

45. A vulcanized rubber derived from rubber or similar material combined with a vulcanizing agent and a thiurammonosulphide in the presence of combined zinc.

46. A vulcanized rubber derived from rubber or similar material combined with a vulcanizing agent and an aryl alkyl thiurammonosulphide in the presence of combined zinc.

47. A vulcanized rubber derived from rubber or similar material combined with a vulcanizing agent and a thiocarbamic acid anhydride.

48. A vulcanized rubber derived from rubber or similar material combined with a vulcanizing agent and a thioacyl sulphide.

49. A vulcanized rubber derived from rubber or similar material combined with a vulcanizing agent and a substance having the group $$\text{cyclic} \diagdown_{\text{alkyl}} \text{NC} - \underset{\underset{S}{\|}}{S} - \underset{\underset{S}{\|}}{CN} \diagdown^{\text{cyclic}}_{\text{alkyl}}$$

50. A vulcanized rubber derived from rubber or similar material combined with a vulcanizing agent and the compound $$\underset{CH_3}{C_6H_5} \diagdown \text{NC} - \underset{\underset{S}{\|}}{S} - \underset{\underset{S}{\|}}{CN} \diagdown^{C_6H_5}_{CH_3}$$

51. A rubber vulcanized under approximately 40 lbs. steam pressure for approximately 10 minutes derived from rubber or similar material combined with 10 parts of zinc oxide, 3 parts of sulphur and 0.1 part of diphenyldimethylthiurammonosulphide.

52. A process of vulcanizing rubber or similar material which comprises combining with the rubber a vulcanizing agent and an accelerator comprising the group $$\underset{\underset{X}{\|}}{R}\underset{\underset{X}{\|}}{CSCR},$$

and vulcanizing the rubber at a temperature below the normal hot vulcanization temperature.

53. A process of vulcanizing rubber or similar material which comprises combining with the rubber a vulcanizing agent and an accelerator comprising the radical $$\underset{\underset{X}{\|}}{N}\underset{\underset{X}{\|}}{CSCN}$$

in the presence of a combined metal M', and vulcanizing the rubber at a temperature below the normal hot vulcanization temperature.

54. A process of vulcanizing rubber or similar material which comprises combining with the rubber a vulcanizing agent, an accelerator comprising the radical $$\underset{\underset{X}{\|}}{N}\underset{\underset{X}{\|}}{CSCN}$$

in the presence of a combined metal M', and an amine, and vulcanizing the rubber at a temperature below the normal hot vulcanization temperature.

55. A rubber vulcanized at a temperature below the normal hot vulcanization temperature derived from rubber or similar material combined with a vulcanizing agent and an accelerator comprising the group $$\underset{\underset{X}{\|}}{R}\underset{\underset{X}{\|}}{CSCR}.$$

56. A rubber vulcanized at a temperature below the normal hot vulcanization temperature derived from rubber or similar material combined with a vulcanizing agent and an accelerator comprising the radical $$\underset{\underset{X}{\|}}{N}\underset{\underset{X}{\|}}{CSCN}$$

in the presence of a combined metal M'.

57. A rubber vulcanized at a temperature below the normal hot vulcanization temperature derived from rubber or similar material combined with a vulcanizing agent, an accelerator comprising the radical $$\underset{\underset{X}{\|}}{N}\underset{\underset{X}{\|}}{CSCN}$$

in the presence of a combined metal M' and an amine.

58. The process of treating rubber or similar materials which comprises combining it with sulphur, diphenyldimethylthiurammonosulphide, and vulcanizing the rubber.

59. A vulcanized rubber derived from rubber or similar materials combined with sulphur, and diphenyldimethylthiurammonosulphide.

60. The process of treating rubber or similar materials which comprises combining it with sulphur, diphenyldimethylthiurammonosulphide and zinc in combination, and vulcanizing the rubber.

61. A vulcanized rubber derived from rubber or similar materials combined with sulphur, diphenyldimethylthiurammonosulphide and zinc in combination.

Signed at New York, New York, this 31st day of March, 1922.

SIDNEY M. CADWELL.